Figure 1:
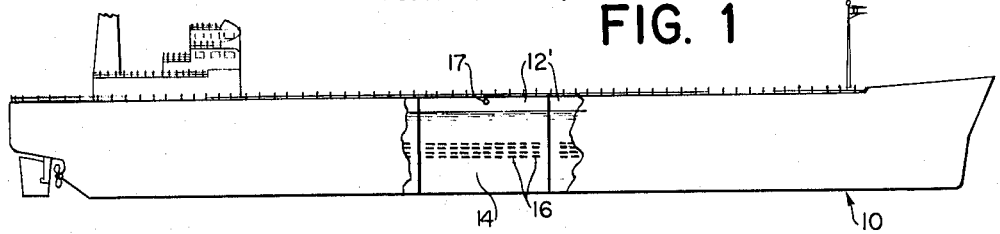

July 12, 1966     B. A. HILLIARD     3,260,231

ROLL STABILIZATION SYSTEM FOR TANKERS

Filed March 31, 1964

INVENTOR.
BRYANT A. HILLIARD
BY *James F. Bryan*
ATTORNEY

United States Patent Office 3,260,231
Patented July 12, 1966

3,260,231
ROLL STABILIZATION SYSTEM FOR TANKERS
Bryant A. Hilliard, Norwalk, Conn., assignor to Esso Research and Engineering Company, a corporation of Delaware
Filed Mar. 31, 1964, Ser. No. 356,286
2 Claims. (Cl. 114—125)

This invention relates generally to roll stabilization systems for vessels and more particularly to a passive roll stabilization system wherein a moment of force counter to the rolling tendency of the vessel is produced by controlled lateral movement of a mass of liquid.

Heretofore, it has been proposed to control rolling of a vessel by the transmission of a mass of liquid transversely of the roll axis in a predetermined out-of-phase relationship to the normal rolling period of the vessel. Such systems have been termed "active" when the transmission of liquid has been influenced by the use of some external means, such as air pressure, and "passive" when movement of the liquid is not controlled by external means. Of the former, the so-called Frahm U-tube systems are notable examples, wherein transmission of liquid in a closed duct was effected by the application of air pressure to a closed duct containing a column of liquid. More recently, passive systems have been devised wherein liquid is permitted to move laterally of a vessel by means of a horizontal duct whose ends define essentially vertically elongated orifices extending from below liquid level to and inclusive of an air space above the liquid. In such systems a transverse wave, unimpeded vertically but restricted horizontally, may flow laterally in some phase relation to vessel roll for stabilization purposes. The foregoing systems, however, while workable in some respects, have been found to destabilize rather than stabilize vessel roll under certain sea conditions.

According to the present invention, I have devised a roll stabilization system which is effective to stabilize vessel roll throughout a much broader range of sea conditions than heretofore possible. The system of the invention is passive in principle, yet is similar in respect to the Frahm closed column system in that primary movement of a liquid column (regulated by discharge orifices) is spaced from compensating movement of an air column above the liquid. Thus, a submerged column of liquid is created beneath the air/liquid interface. However, a wave essentially counter to movement of the primary column may form at the air/liquid interface and movement of the air column itself is essentially unimpeded.

More particularly, the present invention contemplates a roll stabilization system for a vessel, particularly for tankers, comprising in combination, a pair of wing tanks at each side of the vessel with each wing tank being defined in part by a longitudinal bulkhead forming an interior wall thereof. Intermediate the longitudinal bulkheads is a substantially unrestricted cargo chamber which will allow the passage of air and/or liquid laterally between wing tanks. Each of the bulkheads define preferably several openings communicating with the central chamber and each wing tank, which openings are located entirely below the surface of the liquid contained in the wing tanks and in the central chamber. The bulkheads further define at least one opening communicating with the central chamber and each wing tank which is located entirely above the liquid during normal rolling movement of the vessel. By this means, movement of liquid transversely of the vessel through the openings entirely below the surface of the liquid may take place with compensating movement of air through the uppermost openings in each longitudinal bulkhead. The movement of liquid entrapped below the surface level of the liquid/air interface therefore resembles to an extent the closed column movement of the Frahm system, to which reference has been made. However, liquid and air are each permitted freedom of movement restricted only by their respective openings in the longitudinal bulkheads.

Figure 2:
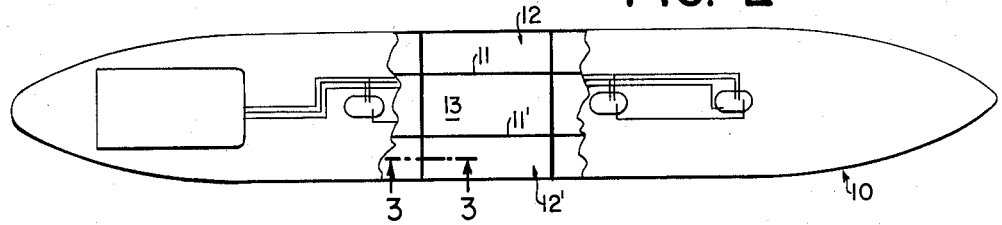
Figure 3:
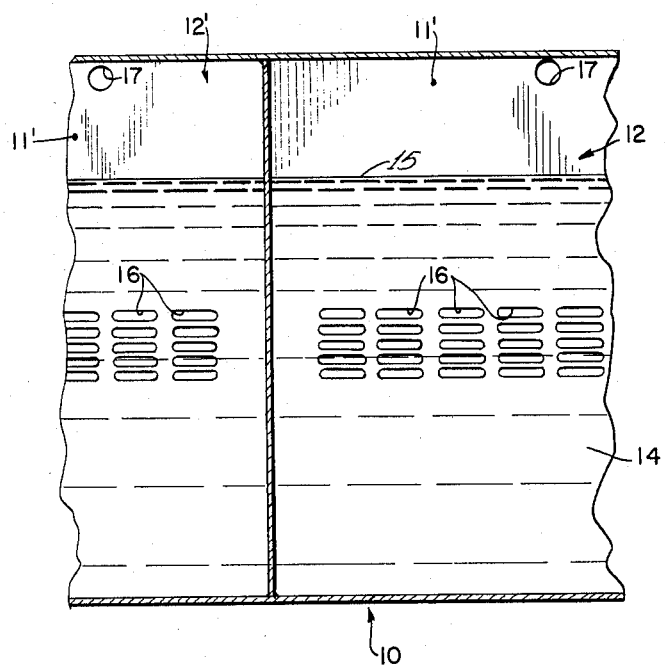

Reference will now be made to a particular embodiment of the invention as set forth in the following description and in the accompanying drawing in which:
FIGURE 1 is a side elevation of a tanker vessel drawn with a central portion cut away to show a roll stabilization system constructed according to the present invention; FIG. 2 is a plan view of the vessel of FIG. 1; and FIG. 3 is an enlarged view taken in the direction of arrows 3—3 of FIG. 2.

Referring now to the drawing, a tanker vessel 10 has been illustrated incorporating a roll stabilization system according to the invention. The vessel 10 has longitudinal bulkheads 11 and 11' which define wing tanks 12 and 12'. Thus, defined intermediate wing tanks is a central cargo chamber 13 and it will be understood that a series of such wing tanks and central chambers 12, 12' and 13 may be formed similarly throughout the length of the vessel. The wing tanks and central chamber are essentially cargo carrying compartments which are normally are adapted to contain a quantity of crude oil 14 or other petroleum liquid.

As will be seen with reference to FIG. 3, each of the bulkheads 11 (not shown in the figure) and 11' define a plurality of slots or orifices 16 which lie completely below the surface level 15 of the liquid 14, even during rolling movement of the vessel. Each longitudinal bulkhead 11 or 11' further defines at least one upper opening 17 which shall be situated at all times above the level of the liquid.

In accordance with the principles of the present invention, the described arrangement of openings in the longitudinal bulkheads 11 and 11', respectively comprise means for the transmission of fluid (both liquid and air) from a wing tank 11 to the central cargo chamber 13 and therefrom to the opposite wing tank 11'. The lower opening 16, permit the passage of a column of liquid which flows primarily beneath the surface of the liquid due to the depth of submersion of the openings 16. Whereas certain wave action may be expected at the liquid air interface, such action will generally be restricted to each of the wing and central compartments. In this sense, a wave may be built up at the liquid/air interface in each compartment which is counter to the continuing or undertow movement of liquid in the column beneath the surface of the liquid or interface. It has been found by actual model tests that the foregoing arrangement is able to stabilize the rolling tendency of the vessel, such as a tank vessel, more completely than would be possible with the so-called active systems and the result is superior under certain sea conditions to the use of passive systems which permit the formation of a wave to occur at the air/liquid interface which is transmitted through vertical openings encompassing the liquid/air interface.

Having described a particular embodiment of the present invention, it will be understood that the foregoing is merely representative and permits of departures therefrom within the teachings of the invention. Therefore, in order to appreciate fully the spirit and scope of the invention, reference should be made to the appended claims.

What is claimed is:

1. A roll stabilization system for a liquid cargo vessel, such as a tanker, comprising in combination, a hull, means within said hull defining a pair of wing cargo tanks extending for substantially the entire height of said hull at each side of said vessel, said means including a longitudinal bulkhead for each wing cargo tank forming an interior side thereof, said bulkheads together forming a substantially unrestricted intermediate cargo chamber therebetween extending for substantially the entire height of said hull for the passage of air and liquid between said wing tanks, said intermediate cargo chamber and wing tanks being adapted to contain a quantity of liquid cargo at a predetermined level and a quantity of air above said level, each of said bulkheads including in a lower portion thereof at least one first opening for placing the liquid cargo within said intermediate cargo chamber in fluid communication with the liquid cargo in the adjacent wing tank, each of said first openings being located at all times entirely below the surface of said liquid cargo during normal rolling movement of said vessel, each of said bulkheads further including at least a second opening communicating with said intermediate cargo chamber and one wing tank, said second opening being located at all times entirely above the surface of said liquid cargo during normal rolling movements of the vessel, said bulkheads further including a liquid impervious central portion extending above and below the surface of the liquid cargo between said first and second opening so that upon rolling of said hull a portion of the liquid cargo from the lower portion of one wing tank is transferred solely through said first opening, mixed with the liquid in a lower portion of said intermediate cargo chamber and thence solely through said second opening into a lower portion of the opposite wing cargo tank, the mixing with the liquid in said intermediate cargo chamber being effective to provide a temporary reservoir for the liquid transferred between said wing tanks and to introduce a time lag to such transfer of liquid cargo between said wing tanks.

2. A roll stabilization system for a liquid cargo tanker vessel comprising, in combination, a hull, means within said hull defining a pair of wing cargo tanks extending for substantially the entire height of said hull at each side of said vessel, said means including a longitudinal bulkhead for each wing cargo tank forming an interior side thereof, said bulkheads together forming a substantially unrestricted intermediate cargo chamber therebetween extending for substantially the entire height of said hull for the passage of air and liquid between said wing tanks, said intermediate cargo chamber and wing tanks being adapted to contain a major volume of petroleum cargo at a predetermined level and a minor volume of air above said level, each of said bulkheads including in a lower portion thereof a plurality of vertically spaced and horizontally adjacent first openings for placing the liquid cargo within said intermediate cargo chamber in fluid communication with the liquid cargo in the adjacent wing tank, each of said first openings being located at all times entirely below the surface of said liquid cargo during normal rolling movement of said vessel, each of said bulkheads further including at least a second opening communicating with said intermediate cargo chamber and one wing tank, said second opening being located at all times entirely above the surface of said liquid cargo during normal rolling movements of the vessel, said bulkheads further including a liquid impervious central portion extending substantially above and below the surface of the liquid cargo between said first and second openings so that upon rolling of said hull a portion of the liquid cargo from the lower portion of one wing tank is transferred solely through said first openings, mixed with the liquid in a lower portion of said intermediate cargo chamber and thence solely through said second openings into a lower portion of the opposite wing cargo tank, the mixing with the liquid in said intermediate cargo chamber being effective to provide a temporary reservoir for the liquid transferred between said wing tanks and to introduce a time lag to such transfer of liquid cargo between said wing tanks, the addition of wing tank liquid cargo into said intermediate chamber also operating to change the natural frequency of the free surface wave occurring during rolling of said vessel in the upper portion of said intermediate chamber.

References Cited by the Examiner

UNITED STATES PATENTS

| 2,077,143 | 4/1937 | Carroll | 114—125 |
| 3,103,198 | 9/1963 | Ripley | 114—125 |
| 3,164,120 | 1/1965 | Field | 114—125 |

FOREIGN PATENTS 688,796  3/1940  Germany.

MILTON BUCHLER, *Primary Examiner.*

FERGUS S. MIDDLETON, *Examiner.*

T. M. BLIX, *Assistant Examiner.*